United States Patent Office 3,772,356
Patented Nov. 13, 1973

3,772,356
PHENOXY-ACETAMIDES
Jacques de Antoni, Gif-sur-Yvette, and Raymonde Eche, Paris, France, assignors to Les Laboratoires Bruneau & Cie, Paris, France
No Drawing. Filed Sept. 13, 1971, Ser. No. 180,219
Claims priority, application France, Mar. 26, 1970, 10,889; Mar. 18, 1971, 9,505
Int. Cl. C07c *103/30*
U.S. Cl. 260—471 R        5 Claims

ABSTRACT OF THE DISCLOSURE

Phenoxy-acetamides of the formula:

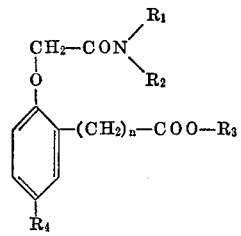

in which $R_1$ is lower alkyl, $R_2$ is lower alkyl or lower alkoxy, $R_3$ is lower alkyl, lower alkenyl, or lower alkynyl, $R_4$ is halogen, and $n$ is 0 to 4, are useful short duration narcotics.

---

The present invention relates to phenoxy-acetamides, a process for their preparation, and their use in therapy.

The compounds of the present invention have the general formula:

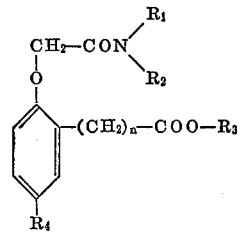

in which $R_1$ is lower alkyl, $R_2$ is lower alkyl or lower alkoxy, $R_3$ is lower alkyl, lower alkenyl or lower alkynyl, $R_4$ is halogen, and $n$ is an integer from 0 to 4. (The term "lower" as used herein means especially radicals of the stated kinds containing up to 6 carbon atoms.)

According to a feature of the invention, the compounds of Formula I are made by reacting a phenol of the formula:

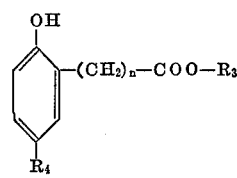

in which $R_3$, $R_4$ and $n$ are as hereinbefore defined, with a reactive ester of an amido-alcohol of the formula:

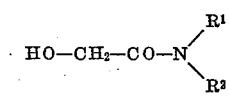

in which $R_1$ and $R_2$ are as hereinbefore defined, in particular a halide, alkylsulphonate or aryl sulphonate ester thereof, in a diluent in the presence of a condensation agent.

As condensation agent, sodium hydroxide, a sodium alcoholate or an alkali metal carbonate is preferably used. The diluent can be, for example, the alcohol corresponding to the radical $R_3$ of the ester of Formula II used, acetone, dimethylformamide or a benzene hydrocarbon.

The compounds of Formula I may also be prepared by reacting a functional derivative, in particular a halide or the anhydride, of an acid of the formula:

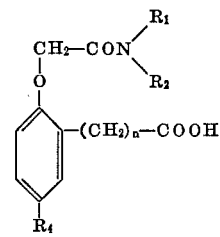

in which $R_1$, $R_2$, $R_4$ and $n$ are as hereinbefore defined, with an alcohol of formula $R_3OH$, where $R_3$ is as hereinbefore defined, or by reacting a reactive ester of this alcohol, for example a halide or tosylate ester with a salt of the acid of Formula IV.

The acids of Formula IV can be prepared by, for example, hydrolysis of the ester group of a compound of Formula I. The process is carried out under sufficiently mild conditions not to hydrolyse the amide group, for example in an aqueous-alcoholic medium in the presence of the theoretical amount of an alkali metal hydroxide.

It is also possible to prepare the compounds of Formula I by reacting an aryloxyacetic acid of the formula:

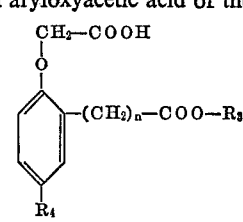

in which $R_3$, $R_4$ and $n$ are as hereinbefore defined, or a reactive functional derivative of this acid, for example an anhydride or a halide, with an amine of formula:

in which $R_1$ and $R_2$ are as hereinbefore defined, or a reactive functional derivative thereof, such as an N,N-dialkylcarbamoyl halide of formula:

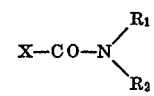

One compound of Formula I may be converted into another compound of that formula by trans-esterification, that is to say by converting one phenoxy-acetamide of Formula I into another in which the radical $R_3$ is different. For this purpose, the reaction is carried out in the alcohol of Formula $R_3OH$ (where $R_3$ is the radical in the desired compound of Formula I) preferable in the presence of a small amount of sodium alcoholate as catalyst.

The examples which follow illustrate the invention.

EXAMPLE 1 n-Propyl 2-(N,N-diethylcarbamoyl-methoxy)-5-chlorobenzoate

Process (a).—13.5 g. (63 mM.) of n-propyl 5-chlorosalicylate are added to a solution of 1.45 g. (63 mM.) of sodium in 90 ml. of n-propanol. The propanol is evaporated under reduced pressure. The residue is taken up in 40 ml. of dimethylformamide and 10.5 g. (69.3 mM.) of N,N-diethylchloroacetamide are added dropwise at ambient temperature. The mixture is heated to 90–95° C. until it is no longer basic, which requires about one hour. The solution is cooled and poured into 250 ml. of water. The oily phase is extracted with 100 ml. of diethyl ether. The ether solution is dried over sodium sulphate, the ether is evaporated, and the residue is distilled under reduced pressure. n-Propyl 2 - (N,N - diethylcarbamoyl-methoxy)-5-chlorobenzoate is obtained, boiling at 175–180° C. under 0.05 mm. Hg $n_D^{20}$=1.5250.

n-Propyl 5-chlorosalicylate can be prepared by heating under reflux a solution of the corresponding acid in n-propanol, in the presence of sulphuric acid. It is purified by distillation, B.P. 146–150° C. under 20 mm. Hg.

Process (b).—35 ml. of a 2 N aqueous sodium hydroxide solution are added to a solution of 22 g. (70 mM.) of ethyl 2-(N,N - diethylcarbamoyl-methoxy)-5-chlorobenzoate in 75 ml. of ethanol. The mixture is heated under reflux for 2 hours, the solvent is then evaporated, the residue is taken up in water, and the solution is acidified with 5 N HCl. The precipitate is filtered off and recrystallized from benzene. 2 - (N,N - diethylcarbamoyl-methoxy)-5-chlorobenzoic acid is obtained, M.P. 162° C. (inst.).

1.54 g. (5.3 mM.) of this acid, dissolved in 3 ml. of benzene, are treated at 0° C. with 1.15 ml. (15.9 mM.) of thionyl chloride. The mixture is stirred for 2 hours at 20° C. and then for 15 minutes at 40° C. The solvent is evaporated under reduced pressure and the residue is crystallised from petroleum ether. The chloride of 2-(N,N-diethylcarbamoyl-methoxy)-5-chlorobenzoic acid is filtered off and dried under reduced pressure, M.P. 68° C. (inst.).

A solution of 1.61 g. of this acid chloride in 10 ml. of n-propanol is heated under reflux for 30 minutes. The alcohol is evaporated under reduced pressure. Rectification of the residue yields the n-propyl 2-(N,N-diethylcarbamoyl-methoxy)-5-chlorobenzoate described above.

Process (c).—A mixture of 10 g. (35 mM.) of 2-(N,N-diethylcarbamoyl-methoxy)-5-chlorobenzoic acid, 140 ml. of acetone, 4.9 g. (35 mM.) of potassium carbonate, and 4.75 g. (38.5 mM.) of n-propyl bromide is heated under reflux for 24 hours. The mixture is filtered after cooling and the acetone is evaporated under reduced pressure. The residue is taken up in 100 ml. of water, and the aqueous phase is extracted with 100 ml. of diethyl ether. The ether solution is dried over sodium sulphate and filtered, and the ether is evaporated under reduced pressure. Distillation of the residue yields n-propyl 2-(N,N-diethylcarbamoyl-methoxy)-5-chlorobenzoate.

Process (d).—A solution of 10 g. of methyl 2-(N,N-diethylcarbamoyl-methoxy)-5-chlorobenzoate and of 0.1 g. of sodium n-propylate in 100 ml. of anhydrous n-propanol is heated under reflux. The methanol is distilled off at the rate at which it is formed. The pH of the solution is then adjusted to 7 with hydrochloric acid. The excess n-propanol is evaporated under reduced pressure. On distillation, the residue yields n-propyl 2-(N,N-diethylcarbamoyl-methoxy)-5-chlorobenzoate.

Process (e).—13.5 g. (63 mM.) of n-propyl 5-chlorosalicylate and 8.04 g. (69.3 mM.) of sodium chloroacetate are added to a solution of 1.45 g. (63 mM.) of sodium in 90 ml. of n-propanol. The mixture is heated under reflux for 15 hours. The alcohol is evaporated under reduced pressure. The residue is taken up in 50 ml. of water and hydrochloric acid is added until pH 3 is reached. The mixture is extracted with diethyl ether and the ether solution is dried over sodium sulphate, filtered, and evaporated under reduced pressure. The residue is directly taken up in 75 ml. of benzene and one or two drops of dimethylformamide, followed by 22.4 g. (189 mM.) of thionyl chloride, are added. The mixture is stirred for 2 hours at 20° C. and then for 2 hours at 80° C., and evaporated to dryness under reduced pressure. The residue is taken up in 100 ml. of benzene and 10.2 g. of diethylamine are added dropwise at 5° C. The solution is stirred for 1 hour under reflux. After cooling, it is washed with a solution of sodium carbonate, dried over sodium sulphate and evaporated to dryness under reduced pressure. Distillation of the residue yields n-propyl 2-(N,N-diethylcarbamoyl-methoxy)-5-chlorobenzoate.

EXAMPLE 2

Methyl 2-(N,N-diethylcarbamoyl-methoxy)-5-chlorobenzoate

This compound is prepared in accordance with Process (a) of Example 1, starting from 11.7 g. of methyl 5-chlorosalicylate. Its boiling point is 162–165° C./0.05 mm. Hg. Instantaneous melting point: 82° C. (after recrystallization from isopropyl ether).

EXAMPLE 3

Ethyl 2-(N,N-diethylcarbamoyl-methoxy)-5-chlorobenzoate

Following Process (a) of Example 1, this compound is prepared from 12.6 g. of ethyl 5-chlorosalicylate. Its boiling point is 168–172° C./0.07 mm. Hg. $n_D^{23}$=1.5306. After recrystallisation from a mixture of isopropyl ether and petroleum ether, it melts at 37–38° C. in a capillary tube.

EXAMPLE 4

Methyl 2-(N,N-diethylcarbamoyl-methoxy)-5-fluorobenzoate

Following Process (a) of Example 1, this compound is prepared from 10.7 g. of methyl 5-fluorosalicylate. Its boiling point is 143–145° C./0.05 mm. Hg $n_D^{22}$=1.5148.

EXAMPLE 5

Ethyl 2-(N,N-diethylcarbamoyl-methoxy)-5-fluorobenzoate

Following Process (a) of Example 1, this compound is prepared from 11.65 g. of ethyl 5-fluorosalicylate. Its boiling point is 140–142° C./0.05 mm.Hg. $n_D^{22}$=1.5091.

EXAMPLE 6

Allyl 2-(N,N-diethylcarbamoyl-methoxy)-5-chlorobenzoate

In accordance with Process (c) of Example 1, this compound is prepared from 10 g. of 2-(N,N-diethylcarbamoyl-methoxy)-5-chlorobenzoic acid and 4.65 g. of allyl bromide. Its boiling point is 167–170° C./0.05 mm. Hg. $n_D^{20}$=1.5373.

EXAMPLE 7 n-Pentyl 2-(N,N-diethylcarbamoyl-methoxy)-5-chlorobenzoate

Following Process (a) of Example 1, this compound is prepared from 15.25 g. of n-pentyl 5-chlorosalicylate. Its boiling point is 197–199° C./0.5 mm. Hg. $n_D^{22}=1.5207$.

n-Pentyl 5-chlorosalicylate is prepared from the corresponding acid in solution in a mixture of n-pentanol and sulphuric acid heated under reflux. It is purified by distillation, B.P. 166–168° C./16 mm. Hg.

EXAMPLE 8 n-Propyl 2-(N,N-diethylcarbamoyl-methyl)-5-chlorophenylacetate

This compound is prepared by a variant of Process (a) of Example 1, so as to avoid any cyclisation of the starting material. 22.5 mM. of sodium n-propylate (prepared from 22.5 mM. of sodium in 20 ml. of n-propanol, and obtained after evaporation of the n-propanol) followed immediately by 3.7 g. (24.8 mM.) of N,N-diethyl-chloro-acetamide are added to a solution of 5 g. (22.5 mM.) of n-propyl 2-hydroxy-5-chlorophenylacetate in 20 ml. of dimethylformamide, at a temperature of between 0° and 5° C. The mixture is stirred for 3 hours 30 minutes at 20° C. The product is isolated and purified as in Process (a) of Example 1. Its boiling point is 168–170° C./0.05 mm. Hg. $n_D^{22}=1.5173$.

n-Propyl 2-hydroxy-5-chlorophenylacetate is prepared from the corresponding acid, which is dissolved in n-propanol saturated with hydrogen chloride. After 10 hours under reflux, the solvent is evaporated and the product is recrystallised, M.P. 59–61° C. (inst.).

EXAMPLE 9

Methyl 2-(N,N-diethylcarbamoyl-methoxy)-5-bromobenzoate

This compound is prepared by Process (a) of Example 1, from 14.6 g. of methyl 5-bromosalicylate. Its boiling point is 161–162° C./0.05 mm. Hg, and its instantaneous melting point is 87° C. (after recrystallisation from isopropyl ether).

EXAMPLE 10

Ethyl 2-(N,N-diethylcarbamoyl-methoxy)-5-bromobenzoate

This compound is prepared by Process (a) of Example 1, from 15.4 g. of ethyl 5-bromosalicylate. Its boiling point is 163–165° C./0.05 mm. Hg. $n_D^{20}=1.5450$. After recrystallisation from isopropyl ether, it melts at 64–65° C. (inst.).

EXAMPLE 11 n-Propyl 2-(N,N-diethylcarbamoyl-methoxy)-5-bromobenzoate

This compound is prepared by Process (a) of Example 1, from 16.4 g. of n-propyl 5-bromosalicylate. Its boiling point is 170–173° C./0.06 mm. Hg. $n_D^{21}=1.5402$.

n-Propyl 5-bromosalicylate is prepared from the corresponding acid, which is dissolved in a mixture of n-propanol and sulphuric acid heated under reflux. It is purified by distillation, B.P. 145–150° C./15 mm. Hg.

EXAMPLE 12

Ethyl 2-(N-ethyl-N-ethoxycarbamoyl-methoxy)-5-chlorobenzoate

This compound is prepared by Process (a) of Example 1, from 12.6 g. of ethyl 5-chlorosalicylate and 11.46 g. of N-ethyl-N-ethoxy-chloroacetamide. Its boiling point is 165–167° C./0.05 mm. Hg. $n_D^{21}=1.5225$.

EXAMPLE 13 n-Butyl 2-(N,N-diethylcarbamoyl-methoxy)-5-chlorobenzoate

This compound is prepared by Process (a) of Example 1, from 14.4 g. of n-butyl 5-chlorosalicylate. Its boiling point is 188–190° C./0.1 mm. Hg. $n_D^{20}=1.5240$.

EXAMPLE 14 sec.-Butyl 2-(N,N-diethylcarbamoyl-methoxy)-5-chlorobenzoate

This compound is prepared by Process (a) of Example 1, from 14.4 g. of sec.-butyl 5-chlorosalicylate. Its boiling point is 158–160° C./0.06 mm. Hg. $n_D^{20}=1.5217$.

sec.-Butyl 5-chlorosalicylate is prepared from the corresponding acid, which is dissolved in a mixture of secondary butanol and sulphuric acid heated under reflux. It is purified by distillation, B.P. 147–150° C./20 mm. Hg.

EXAMPLE 15

Isobutyl 2-(N,N-diethylcarbamoyl-methoxy)-5-chlorobenzoate

This compound is prepared by Process (a) of Example 1, from 14.4 g. of isobutyl 5-chlorosalicylate. Its boiling point is 169–172° C./0.05 mm. Hg. $n_D^{20}=1.5229$.

Isobutyl 5-chlorosalicylate is prepared from the corresponding acid, which is dissolved in a mixture of isobutanol and sulphuric acid heated under reflux. It is purified by distillation, B.P. 148–150° C./15 mm. Hg.

EXAMPLE 16

Propargyl 2-(N,N-diethylcarbamoyl-methoxy)-5-chlorobenzoate

This compound is prepared by Process (c) of Example 1, from 10 g. of 2 - (N,N-diethylcarbamoyl-methoxy) - 5 - chlorobenzoic acid and 4.57 g. of propargyl bromide. Its instantaneous melting point is 71–72° C., after recrystallisation from isopropyl ether.

EXAMPLE 17

Isopropyl 2-(N,N-diethylcarbamoyl-methoxy)-5-chlorobenzoate

This compound is prepared by Process (a) of Example 1, from 13.5 g. of isopropyl 5-chlorosalicylate. Its instantaneous melting point is 67–68° C., after recrystallisation from isopropyl ether.

Isopropyl 5-chlorosalicylate is prepared from the corresponding acid, which is dissolved in a mixture of isopropanol and sulphuric acid heated under reflux. It melts at 42–45° C. (inst.).

The halogeno-phenoxyacetamides of Formula I possess valuable pharmacological properties, and more especially a short narcotic action comparable with that of corresponding phenoxy-acetamides which possess an aliphatic group in the para-position to the carbamoyl-methoxy group, without in many cases showing any excito-motor phenomena.

Pharmacological study of these new compounds has given the following results:

(I) ACUTE INTRAVENOUS TOXICITY IN MICE

Procedure.—A solution of the compound under test in a mixture of distilled water and "Ricinion" (polyoxyethylenated castor oil) at a concentration of 2.5%, is rapidly (in 20 seconds) injected intravenously into 6 male mice weighing 20.2 g. each at the rate of 0.4 ml. per 20 g. The $LD_{50}$ was calculated by the method of Karber and Behrens (Arch. Exp. Pharmakol. 1931, 162, 480). The results obtained are shown in the following Table I.

TABLE I

| Product of Ex. No.— | LD₀, mg./kg. i.v. | LD₅₀, mg./kg. i.v. | LD₁₀₀, mg./kg. i.v. | Symptoms |
| --- | --- | --- | --- | --- |
| 1 | 75 | 120 | 150 | Excito-motor phenomena before and during sleep. |
| 2 | 100 | 160 | 200 | Sleep without symptoms, death through respiration stopping. |
| 3 | 100 | 120 | 150 | Do. |
| 4 | 150 | 230 | 250 | Excitation, convulsions at high doses, Apnoea. |
| 5 | 75 | 145 | 200 | Cardiac stoppage, cries during sleep. |
| 6 | 150 | 250 | 250 | Excito-motor phenoma before and during sleep. |
| 7 | 100 | 165 | 250 | Do. |
| 8 | 150 | 210 | 250 | Excito-motor phonemena before and during sleep plus stiffness and contractions on waking. |
| 9 | 150 | 175 | 200 | Sleep without symptoms, death through respiration stopping. |
| 10 | 75 | 135 | 200 | Do. |
| 11 | 75 | 130 | 200 | Sleep without striking symptoms. |
| 12 | 150 | 165 | 250 | Considerable difficulty in breathing. |
| 13 | 50 | 100 | 150 | Excito-motor phenomena before and during sleep. |
| 14 | 75 | 95 | 150 | Do. |
| 15 | 50 | 115 | 200 | Do. |
| 16 | 150 | 210 | 250 | Do. |

(I) HYPNOTIC ACTIVITY ON INTRAVENOUS ADMINISTRATION TO MICE

Procedure.—A solution of the compounds under test in a mixture of distilled water and "Ricinion," at a concentration of 2.5%, is rapidly (in 10 seconds) injected intravenously into 6 male mice each weighing 20.2 g., at the rate of 0.4 ml./20 g. The absence of the return reflex is used as the criterion of sleep. The results are given in Table II.

TABLE II

| Product of Ex. No.— | Dose (in mg./kg., i.v.) which proves hypnotic in 100% of the animals treated | Duration of sleep (in minutes) |
| --- | --- | --- |
| 1 | 25 to 75 | 8 mins. to 18 mins. |
| 2 | 25 to 100 | 2 mins. 30 secs. to 7 mins. |
| 3 | 25 to 100 | 4 mins. 30 secs. to 12 mins. |
| 4 | 100 to 150 | 1 min. 30 secs. to 2 mins. 30 secs. |
| 5 | 100 | 5 mins. 30 secs. |
| 6 | 75 to 250 | 1 min. to 11 mins. |
| 7 | 25 to 100 | 4 mins. 30 secs. to 15 mins. |
| 8 | 25 to 150 | 1 min. 15 secs. to 7 mins. 30 secs. |
| 9 | 25 to 150 | 1 min. 30 secs. to 6 mins. 45 secs. |
| 10 | 25 to 75 | 2 mins. to 6 mins. |
| 11 | 25 to 75 | 3 mins. 30 secs. to 10 mins. |
| 12 | 25 to 150 | 2 mins. 30 secs. to 9 mins. 15 secs. |
| 13 | 25 to 100 | 5 mins. 45 secs. to 20 mins. |
| 14 | 25 to 75 | 4 mins. to 20 mins. |
| 15 | 25 to 75 | 3 mins. to 9 mins. |
| 16 | 100 to 150 | 2 mins. 30 secs. to 8 mins. |

The compounds of the invention can be used both in man and in animals because of their narcotic activity of short duration, in particular for minor surgery.

They are preferably administered parenterally, more particularly intravenously, as dispersions or solutions in a mixture of water and an emulsifier or solubilising agent suitable for pharmaceutical use. It is also possible to add inorganic salts, for example sodium chloride or salts of phosphoric acid, to the solution to ensure that the active principle is more stable or to improve the clinical use conditions of this solution.

When administered intravenously, the compounds of Formula I show an effective narcotic activity at doses ranging from 5 mg./kg. to 30 mg./kg.

The following is an example of a pharmaceutical composition.

7.5 g. of ethyl 2-(N,N-diethylcarbamoyl-methoxy)-5-chlorobenzoate and 20 g. of polyoxyethylenated castor oil (for example the commercial product "Ricinion," density 1.050 to 1.055 at 20° C., saponification number: 65 to 85, iodine number: 30 to 40, or the commercial product "Cremophor EL," density 1.05 at 25° C., saponification number: 60 to 70, iodine number: 28 to 32) are mixed. The mixture is diluted to 100 ml. with physiological saline, filtered, and divided amongst 5 ml. or 10 ml. ampoules, which are sterilised.

It is also possible separately to prepare and sterile ampoules containing, on the one hand, 0.75 g. of active principle and 2.0 g. of polyoxyethylenated castor oil (Ricinion) and, on the other, 10 ml. of physiological saline, these being mixed at the time of use.

In preparing the pharmaceutical compositions, it is advantageous to use polyoxyethylenated castor oil the content of polyethylene glycol radicals in which has been reduced by a known process, for example as follows.

A solution of 1 kg. of commercial polyoxyethylenated castor oil and of four litres of distilled water is heated near the reflux temperature for two hours, under an inert atmosphere. Two phases form. The mixture is cooled to about +5° to +10° C. while avoiding all stirring. The upper aqueous phase is syphoned off. The lower phase, corresponding to the castor oil in which the content of polyethylene glycol radicals has been reduced, is dried by evaporation under reduced pressure and at a moderate temperature, using a rotary evaporator.

It is also possible to use commercially available polyoxyethylenated castor oil, employed as the solvent after having extracted therefrom, with petroleum ether, a water-insoluble fraction representing 5% to 15% of the initial product. To obtain this so-called "de-oiled" polyoxyethylenated castor oil, it appears preferable to employ a petroleum ether boiling at 40–65° C. and to carry out the process under an inert atmosphere. Either successive extractions or one continuous extraction are carried out. In the case of successive extractions, six to ten extractions are estimated to be sufficient. The polyoxyethylenated castor oil is then freed of the petroleum ether which it retains, by evaporation under reduced pressure, using a rotary evaporator.

These various polyoxyethylenated castor oils, namely the commercially available oil, the oil in which the polyethylene glycol content has been reduced, and the "de-oiled" oil in which the amount of the water-insoluble fraction has been reduced with petroleum ether, appear to show different toxicities, the so-called "de-oiled" polyoxyethylenated castor oil appearing to be best tolerated. However their solvent power towards the compounds of Formula I does not differ significantly. The phenoxy-acetamides of the present invention require a particularly low amount of solvent to be dissolved in water. In fact, a mixture of solvent and active principle in the ratio $$\frac{\text{Weight of solvent}}{\text{Weight of active principle}}$$

less than three, and possibly as little as two, gives stable aqueous solutions of the phenoxy-acetamides.

We claim:
1. A phenoxy-acetamide of the formula:

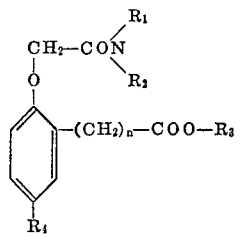

in which $R_1$ is lower alkyl, $R_2$ is lower alkyl or lower alkoxy, $R_3$ is lower alkyl, lower alkenyl, or lower alkynyl, $R_4$ is halogen, and $n$ is an integer from 0 to 4.

2. A phenoxy-acetamide according to claim 1, of the formula:

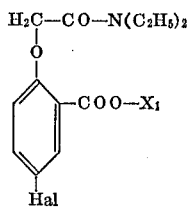

in which $X_1$ represents $CH_3$, $C_2H_5$, $n$-$C_3H_7$, $i$-$C_3H_7$, $n$-$C_4H_9$, sec-$C_4H_9$, iso-$C_4H_9$, $CH_2$—$CH$=$CH_2$ or $CH_2$≡$CH$, and Hal represents F, Cl or Br.

3. A phenoxy-acetamide according to claim 1 of the formula:

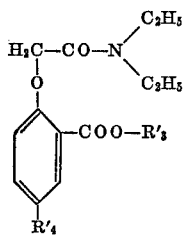

in which $R'_3$ is $CH_3$ or $C_2H_5$ and $R'_4$ is Cl or Br.

4. The phenoxy-acetamide according to claim 1 of formula:

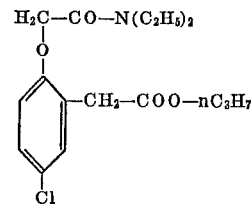

5. The phenoxy-acetamide according to claim 1 of formula:

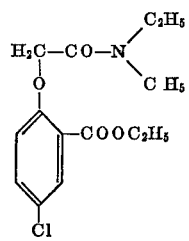

References Cited
UNITED STATES PATENTS 3,692,821  9/1972  Sarett et al. _____ 260—471 R LORRAINE A. WEINBERGER, Primary Examiner L. A. THAXTON, Assistant Examiner U.S. Cl. X.R.

424—309